Dec. 19, 1939.   J. E. WOLLENWEBER   2,183,927
CONTAINER FABRICATING MACHINE
Filed Oct. 29, 1937    4 Sheets-Sheet 3
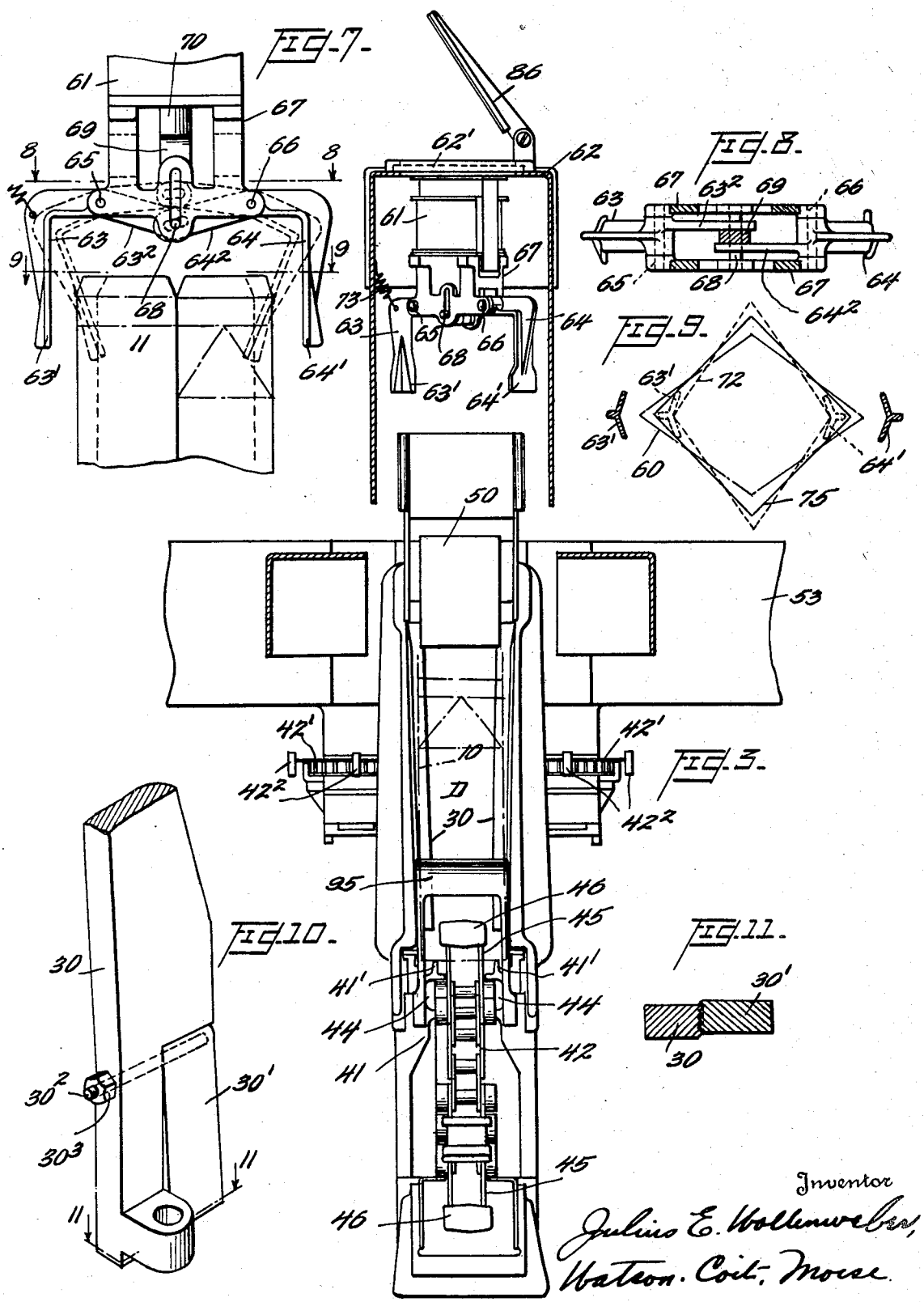

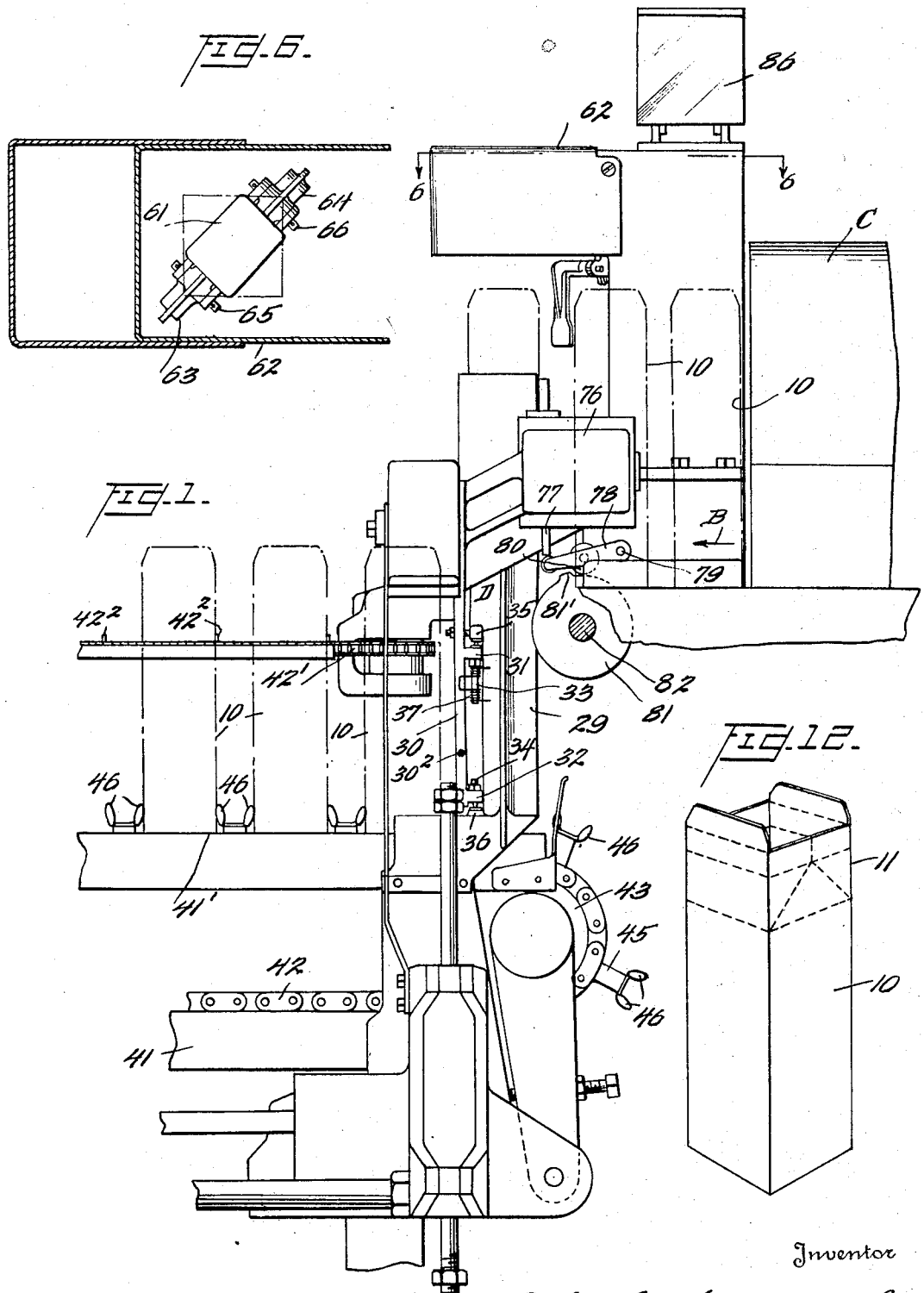

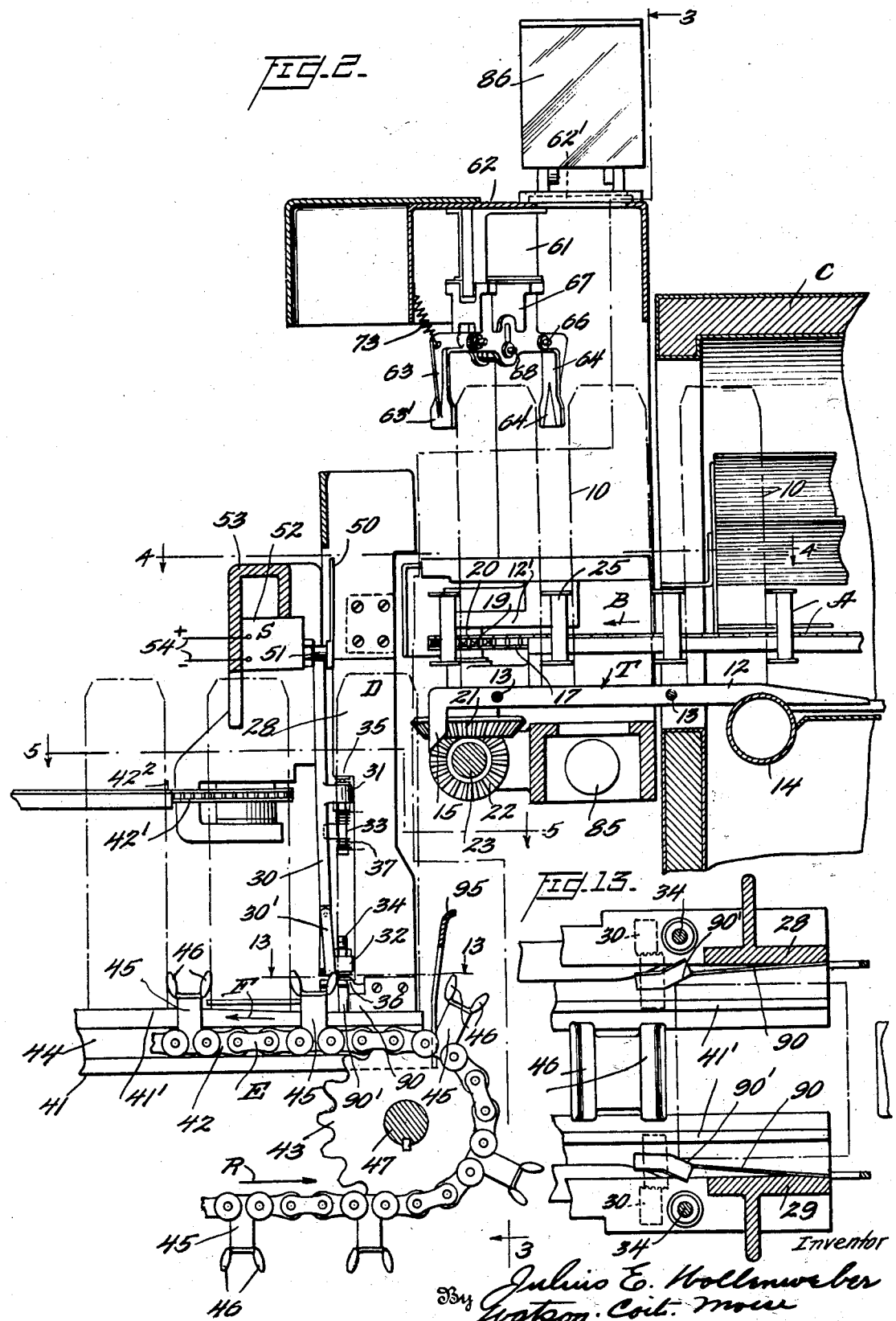

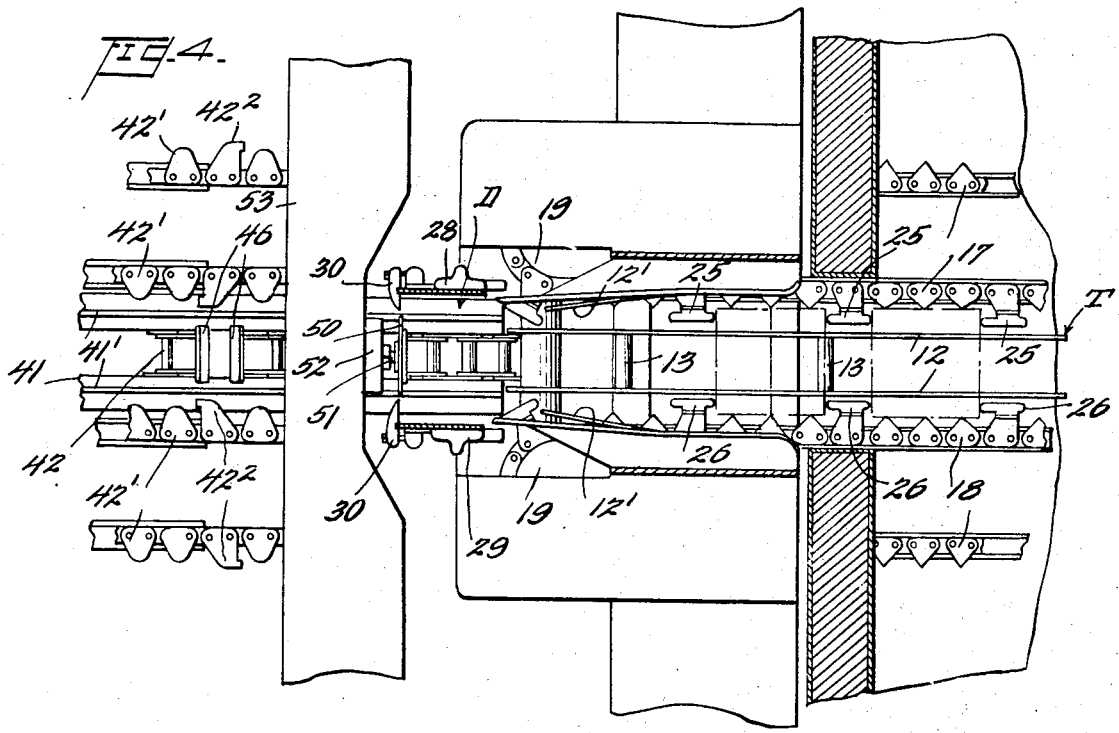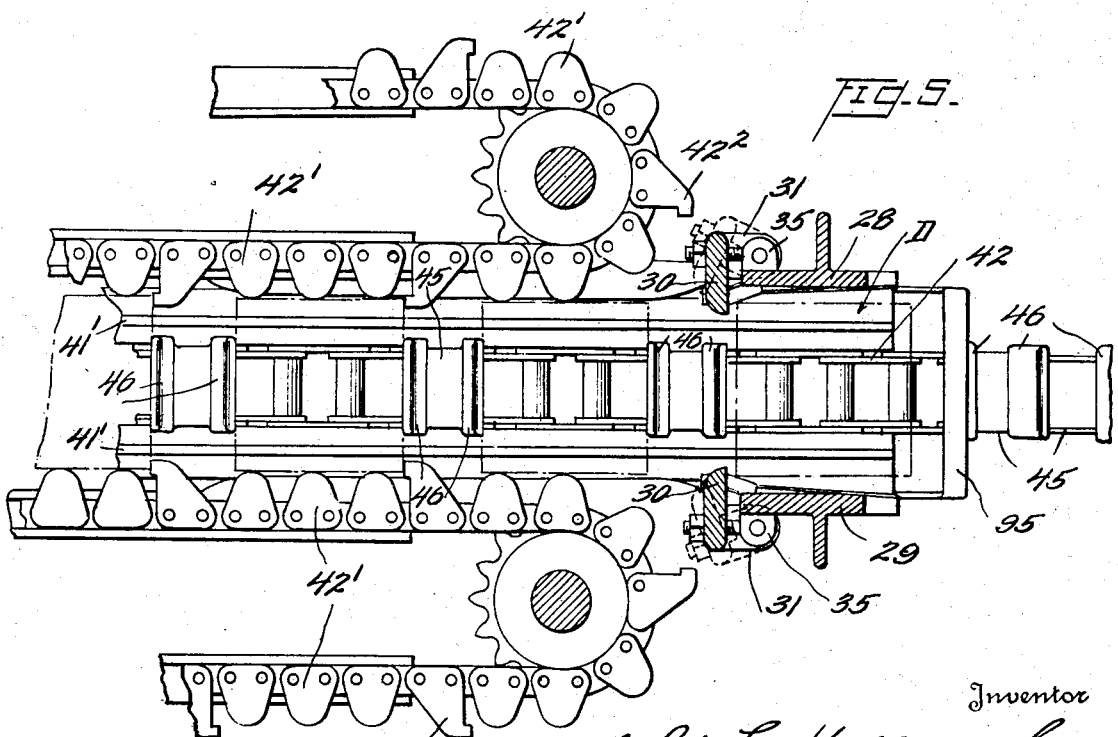

Patented Dec. 19, 1939

2,183,927

UNITED STATES PATENT OFFICE 2,183,927

CONTAINER FABRICATING MACHINE

Julius E. Wollenweber, Detroit, Mich., assignor to The American Paper Bottle Company, Toledo, Ohio, a corporation of Ohio Application October 29, 1937, Serial No. 171,778

14 Claims. (Cl. 93—53)

This invention relates to machines for fabricating containers and more especially to machines for forming, charging, closing and sealing paper containers of the type disclosed, for instance, in Patent 2,047,891, issued to Henry T. Scott July 14, 1936.

The container disclosed in the patent just mentioned is a tube of square cross-section and may easily be made in various sizes, for instance half pints, pints and quarts, the container of largest size differing from the container of smallest size only in its length or height, the bottom and top constructions of all containers of the series being identical. Hence a complete automatic machine for the fabrication, charging, closing and sealing of such containers should be readily adjustable in order that containers of any desired size within the maximum and minimum limits, may be fabricated, charged and sealed thereon.

In Patent No. 2,085,477, issued June 29, 1937, to Henry T. Scott is disclosed portion of a complete automatic machine for charging, closing and sealing containers of the specified type, which containers have been previously partially completed by other mechanism. The machine disclosed in the patent just mentioned includes a conveyor which is designed and constructed to successively receive and clamp empty containers placed upon one end thereof, and to successively present such containers to the various charging, closing and sealing instrumentalities, this conveyor being adjustable bodily with respect to such instrumentalities in order that it may accurately present to them containers of different heights and capacities. Preferably this machine comprises portion of a larger mechanism which includes devices for removing single blanks from a pack of blanks, opening or squaring out the blank, forming the bottom by gluing and folding the bottom flaps, and coating the container as so far fabricated, both interiorly and exteriorly, with a film or layer of a liquid proofing substance. This mechanism for initially forming the container, closing one end and then coating it with a liquid proofing substance, is bulky and of great weight so that it may not be conveniently made vertically adjustable without great inconvenience. It embodies means for successively delivering partly formed and liquid proofed containers to a point of discharge and from which point the containers are dropped upon the conveyor previously mentioned and the function of which is to present such containers successively to the charging, closing and sealing mechanisms. Inasmuch as this conveyor is, as aforesaid, vertically adjustable, the problem presents itself of providing a suitable means for receiving containers discharged from the container delivering means, (which may itself be a conveyor) and transferring such containers to a conveyor, the position of which will be varied from time to time.

One type of mechanism well adapted to accomplish this object is disclosed in Patent 2,085,- 477, previously referred to. An improved type of mechanism for accomplishing this object is illustrated in the accompanying drawings and will be hereinafter described in detail, the principal purpose of the present invention being to provide a mechanism by means of which containers may be successively deposited upon a conveyor in a more certain manner, for all possible positions of adjustment of the conveyor. Associated with the novel mechanism is a safety device for detecting any irregularity in its operation which might result in the catching or jamming of containers and lead to the injury of the machine, the safety device being suitably connected to a stop mechanism and interrupting the operation of the machine as an entirety until the machine has been cleared of any defective containers and adjusted, if adjustment is necessary.

The invention also includes a device for acting upon each container just prior to the time when it is to be placed upon the conveyor for the purpose of reshaping the same, when such reshaping is necessary, in order that the containers may be handled by the transfer device without danger of sticking. As the containers are received from the coating mechanism, with one end closed and the other end open, they are frequently found to be slightly distorted at or adjacent the open end so that, instead of being truly rectangular or polygonal in cross-section, they tend to be diamond shaped, the distance between one pair of diametrically opposed corners being greater than the distance between the second pair of such corners. Containers the open ends of which are so distorted are likely to stick in and clog the container depositing mechanism, paving the way to injury to the machine, and an important feature of the invention, therefore, consists in the provision of means for restoring to original rectangular or polygonal shape, the open ends of empty containers, just prior to introduction of such containers into the said mechanism. The invention further contemplates the provision of means whereby the finished bottoms of the containers may be inspected in order that imperfections in manufacture may be detected and such containers removed from the machine prior to charging, closing and sealing.

That form of the invention which has been selected for disclosure by way of example is clearly illustrated in the accompanying drawings, in which:

Figure 1 is a side elevation of that portion of a container fabricating machine which includes the improved conveyor loading mechanism;

Figure 2 is a vertical longitudinal section through this same portion of the machine;

Figure 3 is a section on line 3—3 of Figure 2;

Figure 4 is a section on line 4—4 of Figure 2;

Figure 5 is a section on line 5—5 of Figure 2;

Figure 6 is a section on line 6—6 of Figure 1;

Figure 7 is a side elevation of portion of the container top squaring device;

Figure 8 is a section on line 8—8 of Figure 7;

Figure 9 is a section on line 9—9 of Figure 7;

Figure 10 is a perspective view of portion of one of the elements of the invention;

Figure 11 is a section on line 11—11 of Figure 10;

Figure 12 is a perspective view of a container of the type which the mechanism is particularly designed to handle; and Figure 13 is a section on line 13—13 of Figure 2.

No attempt has been made to illustrate in the drawings any portions of the complete automatic paper bottle or container fabricating machine for use with which the present invention has been especially designed, other than those which are located immediately adjacent the novel conveyor loading mechanism now to be described.

The type of paper container which the mechanism now to be described is particularly designed to handle is illustrated in perspective in Figure 12. It comprises an elongated body portion, indicated at 10, a foldable top indicated at 11, and a closed bottom (not illustrated). The container shown has the proportions of one intended for the packaging of quarts of liquid and it will be understood that a container of this type having a pint capacity will be similarly constructed at its top and bottom, but that the body 10 will be shorter, the body of a container of one-half pint capacity being still shorter. In the drawings a number of containers are illustrated in chain lines, the upper row of containers shown in Figures 1 and 2 being continuously advanced by a conveyor mechanism generally indicated at A in the direction of the arrow B, this series of conveyors emerging from a cooling chamber C through which the containers have just been passed and in which the previously applied coating of paraffin or paraffin-like material has been caused to harden.

The containers are continuously advanced by means of the conveyor A to a point of discharge, at which point they are in the upper end of the vertically disposed container guide generally indicated at D and down which guide they are allowed to fall successively, the downward movement of each container being halted when its lower end strikes horizontally disposed rails comprising portion of a lower conveyor generally indicated at E, being then gripped between spaced elements of such lower and intermittently operating conveyor E and advanced with a step-by-step movement in the direction of the arrow F into the proximity of and past the several instrumentalities for charging, closing and sealing the foldable top extensions 11. The cooling chamber C and conveyor A are non-adjustable in a vertical direction. The lower conveyor E is, however, vertically adjustable and when either pint or half-pint containers are being passed through the mechanism illustrated, it will be adjusted upwardly with reference to the upper conveyor A through the distance necessary to bring the tops of the containers mounted thereon into positions identical with those actually shown in the drawings. While the lower conveyor E is vertically adjustable for the purpose specified, the details of construction of the adjusting mechanism form no portion of the present invention and any suitable type of conveyor supporting and adjusting mechanism may be employed.

The conveyor A includes a horizontally extending track, indicated generally at T, which comprises spaced parallel rails 12, connected by cross pieces 13, the bottoms of the containers resting upon the upper edges of these rails as indicated clearly in Figures 2 and 4. One end of each rail 12 is welded or otherwise secured to a header 14, or other supporting element located within the cooling chamber C and the opposite ends of these rails are provided with downturned portions 15, as shown in Figure 2, which downturned portions comprise elements of the guide means or chute which guide or constrain the successive containers in their downward movements, after discharge from the upper conveyor. The container advancing means of the upper conveyor includes the endless chains 17 and 18, portions of which only are shown in the drawings, these chains being supported by suitable trackways for movement along endless paths and the two inner reaches of the chains being mounted for movement along parallel paths toward the guide D adjacent which guide each chain passes around a supporting sprocket 19. Each sprocket 19 is mounted upon a short vertical shaft 20 to the lower end of which is affixed a bevel gear 21, each such bevel gear meshing with a second bevel gear 22 fixed on the horizontally extending shaft 23 so as to be driven thereby, gears 22 being so positioned, however, that shafts 20 and sprockets 19 are driven in opposite directions to effect simultaneous and equal movements of chains 17 and 18 with the inner reach of each chain moving from right to left (Figure 4). The chains 17 and 18 carry container-engaging members 25 and 26 which engage the rear vertically disposed walls of the several containers mounted upon the conveyor and remain in engagement therewith until the proximity of the sprockets 19 is reached whereupon they will be moved along outwardly curving arcuate paths and will disengage the container. At this point, however, the rear lower corner of the container passes over the end of supporting track T so that the container may fall freely. It will be understood that shaft 23 will be continuously rotated (by means which is not illustrated) so that each container will have a continuous forward motion.

For the purpose of laterally centering and delivering each container to the chute D in an upright position the two projecting spring blades 12' are provided. These blades converge toward the chute. They engage the leading vertically extending corners of the oncoming containers and afterwards the side walls thereof, whereby they are held in an upright position until the container has passed over the guide rails and is directly over the chute at which point they disengage and the container is falling down the chute.

The series of containers advanced by the upper conveyor will be successively discharged into the upper end of the guide means or chute generally indicated at D. This container guide comprises rigid side members 28 and 29 which preferably comprise portions of the supporting frame of the machine and extend vertically from the proximity of the lower conveyor to points well above the upper conveyor, the flat inner faces of these members being in substantial parallelism. The guide likewise includes displaceable gate members 30, of which there are two, each such gate member comprising a vertically elongated element pivotally connected to the forward edge of the adjacent side member of the guide. Thus each gate member is provided with lateral extensions or brackets, two of which are indicated at 31 and 32 respectively, in Figure 2, these brackets having aligned vertically disposed apertures to receive hinge pins 33 and 34, which pins likewise project through suitably formed vertically disposed recesses or apertures formed in bracket-like projections 35 and 36 integral with the adjacent frame member of the guide. The gates are thus mounted for swinging movements about parallel axes and are adapted to be simultaneously swung from the positions in which they are shown in full lines in Figure 5, to the dotted line positions, shown, by a container as it is withdrawn from the guide D by the action of the lower conveyor.

Torsion springs encircling the upper pivot pin 33 are indicated at 37, each spring having one end anchored to the adjacent frame member and the other end anchored to the gate 30 and serving to normally urge the gate to the position in which it is shown in full lines in the drawings. With the gates in such position the distance between their adjacent inner edges is less than the widths of containers which pass through the machine and hence each container falling downwardly through the guide D will be restrained by the displaceable gates from forward tilting movement, or movement to the left, (Figure 2). Another object of gates 30 is to prevent the containers from falling on top of the engaging elements 46. After a container has reached its lowermost position in the chute, however, and its lower end has been grasped by the lower conveyor chain in a manner now to be described, it may be advanced by such conveyor chain so as to thrust aside the displaceable gates 30, which will be moved from the positions in which they are shown in full lines in Figure 5 to the positions in which they are shown in dotted lines as previously described, thus permitting the container to pass from the guide and to be moved forwardly to be charged, closed and sealed.

The lower conveyor comprises essentially a trackway which includes two parallel rails 41' upon which the bottoms of the containers may rest, these rails comprising portions of the horizontally disposed parallel conveyor chain carrying members 41. The lower conveyor chain is indicated at 42 and is endless, passing over suitable sprockets one of which is indicated at 43, and having lateral extensions which project into the slots 44 of the members 41. At spaced points along its length chain 42 is provided with projections 45 each of which carries two spaced container engaging elements 46. Movement of the chain 42 is in the direction of the arrow R (Figure 2) and as the chain passes around the sprocket 43 the projections 45 dispose themselves radially of the axis of rotation of the sprocket 43, i. e., radially of the axis of the shaft 47 upon which the sprocket forming part of the drive mechanism is mounted, adjacent container engaging elements 46 being thus widely spaced from each other while projections 45 are so disposed. The container supporting members 41' slope upwardly from the chute, as may be perceived in Figure 2. Therefore, a container at the bottom of the chute is at a lower level than the horizontal portions of rails 41'. The lugs 46 are spaced apart a distance slightly less than the container width. When a container is moved forwardly therefore, after being gripped between adjacent lugs 46, it is pressed against the rails 41' and forced upwardly between the lugs to some extent. However, the bottom of the container will continue to engage the rails 41' at all times, which is highly desirable. The lower conveyor also includes two spaced chains 42' disposed in a horizontal plane, the inner reaches of which are disposed in parallelism with and equidistantly from the vertical plane which includes the axis of conveyor chain 42, with the movements of which the movements of the two upper chains 42' are synchronized. Each chain 42' is provided with lugs $42^2$ adapted to engage, and to remain in engagement with, the rear panels of the respective containers mounted upon the lower chain and to support the upper ends of such containers while they are being subsequently acted upon.

The movements of the upper and lower conveyors are so synchronized that a container is discharged from the upper conveyor and allowed to fall into contact with rails 40 and into the temporarily widened space between two adjacent container engaging elements 46, as indicated in Figure 2. In the next advancing movement of the lower conveyor the container engaging element 46 immediately in rear of the container which has just fallen is brought into engagement with the rear wall of that container so that the base of the container will be gripped between two of these elements and the container moved forwardly, the gates 30 being displaced or forced aside by the container as it moves out of the guide D and the guide being cleared for the succeeding container.

If for any reason a container discharged by the upper conveyor A into the chute or guide D, should stick or catch in the upper end of such chute, and not fall onto the conveyor E, the next succeeding container will not be able to properly enter the chute, but on the other hand will contact with and be forced against the container which has become stuck or jammed in the chute, both such containers being crushed, and a third container, and additional containers will pile up at this point unless means is provided for halting the operation of the machine when trouble of this nature first develops.

A safety device for stopping the machine in the event of trouble of this kind is generally indicated at S, and includes a vertically disposed plate 50 the lower end of which is secured to a horizontally extending member 51 which is supported for horizontal axial movement in a bearing in a switch box indicated at 52, which box is in turn mounted upon a portion of the frame of the machine, indicated at 53. The inner end of the plunger 51 is operatively connected to an electrical switch device of any suitable type, and which is not illustrated, which switch controls the flow of current through a circuit which includes the electrical conductors indicated at 54. Normally the switch is open so that no current flows through this circuit and when the switch is closed control mechanism (which is not shown) will be energized and the operation of the entire machine halted. The details of the control mechanism form no part of the present invention and are not illustrated. Any suitable circuit breaking or clutch mechanism may be called into operation when the circuit through conductors 54 is closed. It will be perceived that the pressure plate 50 is positioned in alignment with the upper conveyor A and that containers discharged by the conveyor A will contact with plate 50 before moving downwardly through the guide or chute D. The very light pressure normally exerted by a discharged container, however, is insufficient to effect movement of the plate 50 and operation of the associated switch S. Should, however, a container catch or jam in the upper end of the guide and a second container be delivered by the upper conveyor and forced against the container thus caught, the first container will be thrust against the plate 50 with sufficient force to cause movement of this plate to the left (Figure 2) thus effecting closure of the switch and halting the operation of the conveyors.

As is well known, paper sheets which have been folded or the fibers of which have been otherwise distorted but not broken, tend to resume their original shapes especially after moistening. Where the mechanism of the present invention comprises a portion of a complete automatic container fabricating, charging and sealing machine, it is interposed, as has previously been explained, between the mechanism for squaring out paper blanks, closing the container ends, and coating the partially completed containers with a leakproofing substance, and the mechanism for performing the subsequent operations upon the container, i. e., charging, closing and sealing. Those containers which are moving along the upper conveyor A have, therefore, just been previously constructed from flat scored blanks and immediately thereafter coated with paraffin or paraffin-containing solution so that the fibers along the score lines, which have been distorted, tend to resume their original shapes. This tends to draw the upper end of the container out of a truly rectangular shape, in cross-section, the container end becoming diamond shaped, as indicated in dotted lines at 60 in Figure 9. At least this is true with the longer containers, such as the containers of quart capacity, as illustrated. With shorter containers there is no doubt the same tendency to distortion, but, because of the relatively short body portions of such containers, the amount of distortion at the top is not sufficiently great to make it necessary to make use of any corrective means prior to the entry of the container into the guide or chute D. The amount of distortion of a taller container, however, may be sufficiently great to cause the container to catch or stick in the guide D and hence a mechanism is made use of for the purpose of restoring the upper end of the container to its proper cross-sectional configuration just prior to the entry of such container into chute D.

This mechanism is most clearly illustrated in Figures 3, 7, 8 and 9. It comprises essentially a solenoid 61 the upper end of which is attached to the protective housing 62 in such manner that its axis is vertically disposed and, when prolonged, passes through the plane of the track T midway between rails 12. In other words, the axis of the solenoid lies in the plane of the longitudinal axes of the series of containers which are being advanced along the upper conveyor. While the axis of each successive container is substantially coincident with the axis of the solenoid, the solenoid is energized and the upper end of the container is quickly acted upon by elements connected to the plunger of the solenoid, and is reshaped.

These container-engaging elements comprise the arms 63 and 64, having depending container-engaging ends 63' and 64' and horizontally disposed portions 63² and 64² which portions are pivotally mounted, by pivot members 65 and 66, respectively, upon the lower portion of a depending bracket 67, the upper end of which is secured to the bottom of the solenoid. The inner ends of arms 63² and 64² are in overlapping relationship, and provided with slots to receive a horizontally disposed pin 68, which pin likewise passes through a vertically disposed rod 69 which comprises an extension of the plunger 70 of the solenoid. When the solenoid is energized the plunger 70 is drawn upwardly, the levers 63 and 64 are rocked about parallel pins 65 and 66 and the lower ends of these levers moved from the positions in which they are shown in full lines in Figures 7 and 9 to the positions in which they are shown in dotted lines in these figures. The arms 63 and 64 are disposed in a vertical plane which makes an angle of 45° with the vertical plane of the longitudinal axis of the conveyor A so that, when the lower ends of these arms are caused to approach each other in the manner just described, they will strike opposite corners of a container positioned between the same and will cause these corners to approach each other and the container walls to be moved from the positions in which they are indicated by the dotted lines 60 in Figure 9 to the relative positions in which they are indicated by dotted lines 72 in this figure. In other words, the top of the container, if it is diamond shaped, as indicated by the dotted lines 60, with its major axis in the plane of the arms 63 and 64, will be distorted by these arms until it is diamond shaped, but with its major axis in a plane transverse to the plane of the arms.

Immediately after this has been done the solenoid is de-energized and the spring 73, one end of which is connected to arm 63 and the other end to housing 62, immediately acts to retract arm 63, arm 64 being also retracted due to its connection with arm 63. Hence the container is disengaged and is free to assume such shape as it may naturally tend to assume. If it has been stressed or distorted to the proper amount or degree by the co-action of arms 63 and 64 it will assume the position or shape indicated in full lines in Figure 9, and indicated at 75; in other words, be truly rectangular in cross-section and hence in condition to not only pass downwardly through the chute D without sticking, but to pass onto other portions of the machine to be further acted upon. As has been previously pointed out, it is generally not necessary to apply this shape correcting device to shorter bottles or containers since the amount of distortion of the upper ends of such containers is very materially less than in the case of the longer containers. It will be understood that if the method of container formation employed results in the fabrication of containers which are otherwise distorted at or adjacent the upper ends thereof, the shape-correcting device may be modified to reshape the container ends in other ways, to the end that all containers discharged into the guide or chute will be in condition to freely pass through the same.

Any suitable circuit making and breaking device may be made use of for effecting closure of a circuit through the solenoid 61 in timed relationship to the movement of the conveyors A and E. I may, for instance, make use of a switch 76 supported on the frame, for controlling the flow of current to the solenoid 61, the details of which form no part of the present invention and will not be described. A switch operating member 77 projects without the casing of the switch box and into the path of movement of the free end of a lever 78 pivotally supported at 79 and carrying a roller 80 which rests upon the periphery of a larger roller 81 fixed upon rotatable shaft 82. Protuberance 81' on the periphery of roller 81 periodically contacts with roller 80, thus lifting the lever 78 and a switch operating plunger 77, which results in closure of the switch and energization of the solenoid 61. Continued movement of the roller 81, however, quickly carries the radial projection 81' beyond the roller 80, which permits the lever 78 to fall and results in opening of the switch 76. The shaft 82 may be driven by any suitable means but preferably this shaft comprises an extension of shaft 23 previously referred to and which transmits power to the sprockets for operating the side chains of the upper conveyor.

It is highly advantageous that the empty containers, which have been coated with paraffin-containing or other leak-proofing substance, be inspected prior to charging, closing and sealing and particularly that the bottom constructions of such containers be examined in order that any containers the bottoms of which are imperfectly formed, or imperfectly coated, may be detected and removed. In order that this may be conveniently done, I position a lamp 85 just below the track T of the conveyor A and just below the position which each successive container occupies momentarily before moving into position to be engaged by the arms 63 and 64. The light from this inspection lamp 85 will pass through the translucent bottom of the paper container, at least to such extent that the constructional details of the bottom may be clearly perceived by an observer looking downwardly through the open upper end of the container. For the convenience of such an observer a mirror 86 is adjustably mounted over the top sight opening in casing 62. This opening is closed with glass or other transparent material 62' to prevent falling of foreign matter into the container. The mirror 86 enables an operator standing alongside the machine to easily inspect all of the containers passing along the trackway T and remove any such container the bottom of which does not appear to be perfectly constructed, or which does not appear to be perfectly coated, thus avoiding the hazard of charging an imperfect container with a liquid.

It has been found in the actual use of the invention to be desirable to provide, at the bottom of the guide or chute, means for preventing rebound of containers after impact upon the supporting rails of the lower conveyor and tipping while element 46 forces the containers through the gates 30. The rebound is particularly undesirable where the containers are short since they may turn from the vertical position and become caught in the chute or jam on the engaging element 46. To prevent this, spring devices 90 (Figures 2 and 13) are employed. Each such device comprises a leaf spring, horizontally disposed, having one end fixed to the lower end of a side member of the guide, the other end thereof, which has a downwardly and inwardly inclined surface 90', being adapted to move laterally through a cut-out or aperture in said side member at its lower end. The lower corners of a falling container will strike the inclined surfaces 90' of the devices 90 as the container reaches the bottom of the chute and the action of the spring devices is such that the impact of the container upon the rails is cushioned and rebound prevented. The spring elements 90 will be laterally deflected into the positions shown in Figure 13 when so functioning. They will, however, not interfere with the ready removal of the container from the guide but will be further deflected outwardly when the container is advanced by the lower conveyor. Other types of spring devices for preventing rebound may be employed if desired and in fact numerous component elements of the invention may be modified in design when containers of different types are to be handled.

As will be observed in the drawings each gate 30 has an adjustable portion 30' at its lower inner corner, substantially rectangular, and attached to the gate 30 by means of a horizontally disposed bolt 30², this bolt extending through the upper end of portion 30' and through a horizontally extending cylindrical aperture in the gate, the outer end of the bolt being threaded and having a nut 30³ thereon. The mutually facing edge surfaces of the gate and adjustable portion 30' thereof are serrated, adjacent the lower ends thereof, as shown in Figure 11. The angularity of portion 30' of each gate relatively to the main part thereof may be changed by loosening nut 30³ and disengaging the interlocking serrations, after which part 30' may be angularly moved about the axis of bolt 30². After such adjustment the nut 30³ may be tightened and the serrations referred to brought into interlocking engagement, the part 30' being thus maintained in its adjusted position. It will be observed that the lower edges of portions 30' of the gates lie substantially in the horizontal plane of the container engaging elements 46. As a result a container at the bottom of the chute is, when the lower conveyor chain is next operated, engaged by the next following member 46 and is lightly pinched between this member and the lower edges of gate portions 30' while being moved out of the chute, the gates being opened during such movement but maintaining a back pressure upon the container at its lower end. It is the function of gate portions 30' therefore to prevent the lower end of a container from being suddenly knocked forwardly by the following engaging element 46, and tilted rearwardly due to this sudden impact and the contact of the top of the container with the upper parts of the gate, which would occur were the gate portions 30' not present and rearwardly adjusted. Such tilting would be objectionable because, before the container could right itself, it would be gripped in rearwardly tilted position between two adjacent gripping members 46 and would be difficult to right.

A U-shaped guard in rear of the bottom of chute D is indicated at 95, this guard bridging the conveyor chain 42 and container gripping members 46, its lower ends being secured to the guide rails of the lower conveyor chain. This guard will guide a falling container into proper position in the event that, for any reason, it is deflected, while falling, rearwardly and away from the gates at the front of the chute.

Having thus described the invention, what is claimed as new and desired to be secured by Letters Patent is:

1. In a container fabricating machine, in combination, a horizontally disposed vertically adjustable conveyor having elements thereon for positively engaging containers to ensure advancement of such containers with the conveyor, and a guide positioned above said conveyor for successively receiving containers and guiding them along a predetermined path downwardly onto said conveyor, for all positions of adjustment of said conveyor, said guide comprising two gate members hinged for pivotal movement about parallel axes, and resilient means normally maintaining said gate members in container guiding position but permitting displacement thereof by a container when said conveyor is advanced with the elements thereon pushing the containers.

2. In a container fabricating machine, in combination, a horizontally disposed vertically adjustable conveyor having elements thereon for positively engaging containers to ensure advancement of such containers with the conveyor, and a guide positioned above said conveyor for successively receiving containers and guiding them along a predetermined path downwardly onto said conveyor, for all positions of adjustment of said conveyor, said guide comprising two elongated vertically disposed gate members mounted for swinging movement about parallel axes, and a spring associated with each gate member and lightly urging the same into container guiding position but permitting displacement thereof by a container when the conveyor is advanced with the elements thereon pushing the containers.

3. In a container fabricating machine, in combination, a horizontally disposed vertically adjustable conveyor having elements thereon for positively engaging containers to ensure advancement of such containers with the conveyor, and means for guiding a freely falling container onto said conveyor into position to be engaged by one of said elements, said means having a portion which may be displaced by a container pushed by one of said elements when the conveyor is advanced to permit movement of such container with the conveyor, and means for thereafter returning said portion to container guiding position.

4. The combination set forth in claim 3 in which said displaceable portion includes a gate mounted for pivotal movement about a vertical axis, said gate having a portion at the lower end thereof adjustable horizontally relatively to the remainder of the gate.

5. The combination set forth in claim 3 in which said displaceable portion includes a gate mounted for swinging movement about a vertical axis, said gate having a portion, at the bottom thereof, adjustable about a horizontal axis relatively to the upper part thereof, for the purpose set forth.

6. The combination set forth in claim 3 in which the side of the guide means opposite the displaceable portion thereof comprises a stationary guide having a horizontal portion bridging the conveyor.

7. In a container fabricating machine, in combination, a substantially vertically disposed container guide, means for successively introducing containers horizontally into said guide at the upper end thereof and permitting containers so introduced to fall downwardly, and mechanism for halting said means when a container becomes jammed in the guide, said mechanism including a pressure operable member positioned adjacent the upper end of the guide and opposite said means.

8. In a container fabricating machine, in combination, means for successively conveying containers to a point of discharge and there permitting them to fall, a guide for receiving single containers discharged by said means and laterally guiding such containers while falling, a device associated with said guide which is actuated when said means discharges a container before the preceding container has fallen through said guide, and mechanism associated with the device for halting the operation of said means when the said device is actuated.

9. The combination set forth in claim 8 in which the said device includes a pressure responsive member adapted to be engaged and deflected by a container pressed against the same.

10. In a container fabricating machine, in combination, a horizontally disposed vertically adjustable conveyor, means for guiding a freely falling container onto said conveyor, and resilient means adjacent the conveyor for engaging a falling container and substantially preventing the rebounding thereof from the conveyor.

11. In a container fabricating machine, in combination, a horizontally disposed trackway for containers, means for guiding a freely falling container to cause the bottom thereof to strike said trackway, and opposed spring members permanently located adjacent said trackway at the bottom of said guide so as to be simultaneously engaged and laterally deflected by a falling container, for the purpose set forth.

12. In a container fabricating machine, in combination, means for engaging the closed lower end of a paper container of rectangular cross-section, the upper end of which container is open, transporting the same to a point of discharge and there discharging the same bottom end foremost, a guide of rectangular cross-section for receiving and closely guiding containers discharged by said means, and mechanism for acting upon the upper open end of each container engaged by said means, for squaring said end prior to discharge of the container into the guide.

13. In a container fabricating machine, in combination, means for engaging the closed lower end of a paper container of rectangular cross-section, the upper end of which container is open, transporting the same to a point of discharge and there discharging the same bottom end foremost, a guide of rectangular cross-section for receiving and closely guiding containers discharged by said means, and mechanism for engaging and inwardly deflecting diametrically opposed corners of the open end of each container, and squaring said end, prior to discharge of the container into the guide.

14. In a container fabricating machine, in combination, means for engaging the closed lower end of a paper container of rectangular cross-section, the upper end of which container is open, transporting the same to a point of discharge and there discharging the same bottom end foremost, a guide of rectangular cross-section for receiving and closely guiding containers discharged by said means, and mechanism comprising movably supported members normally positioned on opposite sides of the path of movement of a container engaged by said means, and a device for simultaneously actuating said members, for inwardly deflecting opposed corners of the open end of each container and squaring said end prior to discharge of the container into the guide.

JULIUS E. WOLLENWEBER.